Inventor
PATRICK A. FITZSIMONS

By Kegan, Bellamy & Kegan
Attorneys

United States Patent Office 3,220,360
Patented Nov. 30, 1965

3,220,360
MACHINE FOR THE MANUFACTURE OF
SHAPED COMESTIBLES
Patrick A. Fitzsimons, Dublin, Ireland, assignor to
Leaf Brands, Inc., a corporation of Illinois
Filed July 12, 1963, Ser. No. 294,530
Claims priority, application Ireland, Aug. 7, 1962,
687/62
16 Claims. (Cl. 107—10)

This is a continuation-in-part of application Serial No. 270,907, filed April 5, 1963 and now abandoned.

This invention relates to machines for the manufacture of chewing gum of the type in which pre-formed cylindrical pencils of the chewing gum are fed between a system of power driven sizing rollers adapted to size the pencils to predetermined dimensions, following which the sized pencils are fed between a system of power driven formation rollers adapted to form each pencil into a plurality of separate similar pieces of chewing gum of predetermined shape and size in the final form in which the product is sold, such as in the form of balls of chewing gum, said pieces being delivered from the formation rollers to a discharge chute.

In the known machines of this type, adjustment of the machine for the purpose of altering the sizing of the pencils and/or the final form of the product has necessitated taking down the sizing and/or formation rollers and replacing them with different rollers suitable for the altered sizing and/or formation required, and such adjustment of the machine has heretofore occasioned considerable loss of output time.

It is the object of the present invention to overcome this difficulty by incorporating in machines of the type stated means for convenient and rapid adjustment of the sizing and/or formation roller systems, and with this object in view the invention comprises a machine of the type stated for the manufacture of chewing gum, in which the assembly of sizing rollers and/or formation rollers comprises two sets of spaced apart and axially aligned supporting discs, each set having a plurality of different roller systems extending therebetween and rotatably mounted thereon and each of the sets of discs being rotatable about its central axis to bring any one of the roller systems mounted thereon into operative mating relationship with any one of the roller systems mounted on the other set of discs.

The invention will be more clearly understood from the following description of a preferred embodiment thereof given by way of example only with reference to the accompanying drawings in which:

FIGURE 4 is a detail sectional view of part of the formation roller system taken on the line IV—IV of FIGURES 1 and 3;

Figure 1:
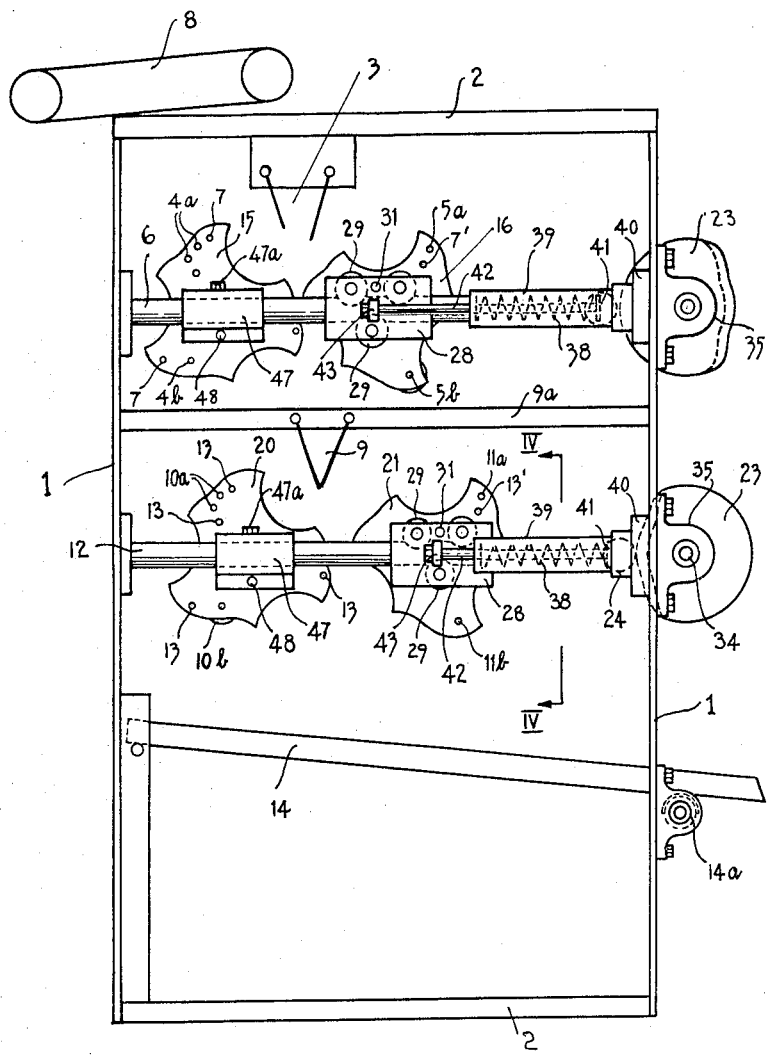
FIGURE 1 is a diagrammatic side view of the machine.

Referring to the drawings, the machine is of the type comprising a pair of frames each formed from a pair of upright members 1 with top and bottom members 2, the frames being bridged by cross members 2a and being braced (not shown) as necessary for strengthening purposes, a hopper 3 suspended from the upper member 2 being fed with pencils of chewing gum from a conveyor 8 and delivering the said pencils between the rotatable rollers 4, 5, of a power driven sizing roller system of which the roller 5 is slidable on horizontal rails 6 extending between the frame members 2a and is adapted to be reciprocated on the rails 6 towards and away from the roller 4. A supporting roller 7 is provided beneath the bite of rollers 4 and 5.

Each time the roller 5 approaches roller 4 a pencil fed from the hopper 3 is passed between the said rollers and is thereby sized to predetermined dimensions, and as roller 5 moves away from roller 4, the sized pencil is delivered into a second hopper 9 suspended from horizontal rails 9a from which it is fed between a power driven system of formation rollers 10, 11, similar to the sizing roller system, and of which roller 11 is slidable on rails 12 for intermittent movement towards and away from the roller 10. A supporting roller 13 is provided beneath the bite of rollers 10 and 11.

Each of the rollers 10 and 11 is provided with a longitudinal series of successive semi-circular recesses as shown in FIG. 4, the recesses of roller 10 mating with those of roller 11, whereby a sized pencil of gum fed from hopper 9 between the formation rollers 10 and 11 as roller 11 is moved towards roller 10, is cut and formed into a succession of balls of chewing gum of predetermined size which fall into a chute 14 when roller 11 is retracted from roller 10. The chute 14 is preferably vibrated continously by means of a power actuated vibrator 14a to maintain uniform flow of the formed balls of chewing gum along the chute 14.

In machines of the aforesaid known type it has heretofore been necessary to remove the sizing roller system 4, 5 and/or the formation roller system 10, 11, when it is desired to manufacture chewing gum of a different size or form and fit replacement systems in their place.

With a view to overcoming the necessity for this time consuming replacement, and in accordance with the present invention, the sizing rollers 4, 5 are rotatably mounted in and extend between a pair of flanges, plates or discs 15 (hereinafter referred to as discs) and a pair of discs 16 respectively, both pairs of discs having a plurality of roller systems 4, 4a, 4b and 5, 5a, 5b rotatably mounted therebetween near the peripheries thereof. As hereinafter explained, the pairs of discs 15 and 16 are rotatably supported upon the horizontal rails 6 to bring any one of the rollers 4, 4a, 4b and 5, 5a, 5b into the operative position, and as hereinafter explained discs 16 are also mounted for sliding reciprocating movement on the rails 6 towards and away from discs 15.

The formation roller assembly is similarly arranged and consists of a plurality of roller systems 10, 10a, 10b and 11, 11a, 11b, rotatably mounted in and extending between a pair of discs 20 and 21 respectively which are rotatably supported upon the horizontal rails 12 to bring any one of the rollers 10, 10a, 10b and 11, 11a, 11b, into operative position, the discs 21 being also adapted for sliding reciprocating movement on the rails 12 towards and away from discs 20.

Figure 2:
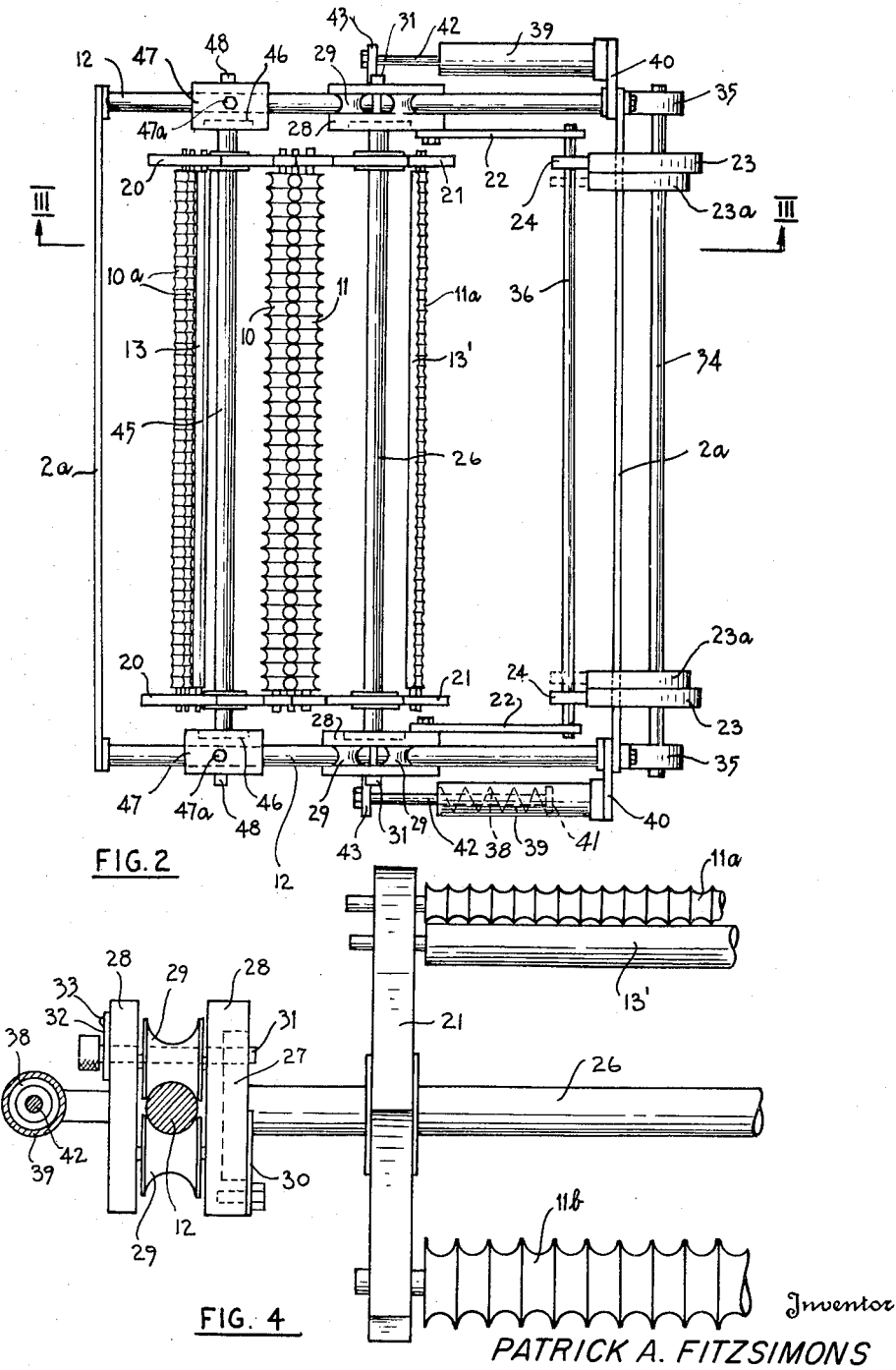
FIGURE 2 is a sectional plan view taken on the line II—II of FIGURE 3, the hopper and chute being omitted for the sake of clearness.

The mounting of each disc 16 for rotation about the axis of its shaft 25 and for the sliding movement on rails 6 is the same as that for the discs 21 on rails 12, and it will therefore suffice to describe the latter with more particular reference to FIGS. 2 and 4.

The discs 21 are fixedly mounted upon a central shaft 26 which is extended at each end and terminates in a pair of clutch plates 27. Each clutch plate 27 is rotatably mounted within a recess formed in the outer face of the inner cheek of a carriage 28 slidably mounted on rail 12 by means of runner wheels 29 engaging above and below the rail 12 and rotatably mounted between the cheeks of the carriage 28. A backing plate 30 bolted to the inner cheek of each carriage 28 prevents outward displacement of the clutch plate 27 in the recess therefor. A clutch pin 31 passes horizontally through a pair of aligned holes in the cheeks of each carriage 28 and is engaged selectively in one of a plurality of holes formed in the clutch plate 27 near the periphery thereof, it being understood that shaft 26 with the discs 21 mounted thereon is rotated manually to bring any particular one of the roller systems 11, 11a, or 11b into the operative position, the number of holes in each clutch plate 27 corresponding to the number of roller systems provided on the discs 21, and the disposition of the holes in each clutch plate being such as to bring each roller system into its correct operative position when each clutch pin 31 is engaged in the appropriate hole in each clutch plate 27. Each clutch pin 31 is locked in its engaging position by means of a clip 32 hinged at 33 to the carriage 28 and engageable in a peripheral groove (not shown) provided on the clutch pin 31.

Sliding movement of each carriage 28 and the discs 21 towards the discs 20 is effected by means of a pair of similar cams 23 fixedly mounted upon a power driven shaft 34 rotatably supported in bracket bearings 35 mounted on the upright frame members 1, said cams 23 engaging a pair of rollers 24 mounted upon a cross shaft 36 connected at its ends by a pair of links 22 with the two carriages 28. Return sliding movement of each carriage 28 and the discs 21 away from the discs 20 is effected by spring return means consisting of a pair of coil springs 38, each of which is housed within a cylinder 39 rigidly mounted by means of a bracket 40 to one of the frame members 2a, each spring 38 being confined within the cylinder 39 between a piston 41 and the opposite end of the cylinder 39, the piston 41 being rigidly connected by means of a connecting rod 42 with bracket 43 mounted on the exterior side of each carriage 28.

Thus, each time the cams 23 effect movement of the carriages 28 and discs 21 towards discs 20, the pistons 41 and connecting rods 42 are similarly moved therewith against the action of the springs 38 under the influence of which the assembly is drawn back again to its retracted position when the cam influence ceases.

To permit of ready variation of the stroke movement of the carriages 28 and discs 21, as described below, one or more additional pairs of cams 23a having a different throw from that of the pair of cams 23 may be provided on shaft 34, the pair of rollers 24 being made slidably adjustable on shaft 36 to engage selectively with any desired pair of cams. The present invention does not lie in any particular mechanism or arrangement for driving the rollers of the gum shaping machine, and the sizing rollers 4, 5 and 7 and the formation rollers 10, 11 and 13 and the corresponding rollers of the other systems, may be driven by any preferred mechanical arrangement. For example, the driving mechanism may comprise an electric motor connected by suitable gearing, power shaft, and a driven chain to sprocket wheels fastened onto the shafts of the rollers, all as is well known in the art. A typical arrangement is illustrated in U.S. Patent No. 2,031,573.

Since in the practice of the present invention, a simple sprocket and chain drive system is utilized, no exhaustive description is provided herein, the following information being included solely for the purpose of rendering the instant disclosure complete. The simple mechanics and the basic engineering principles involved are well known to those skilled in the art.

Figure 3:
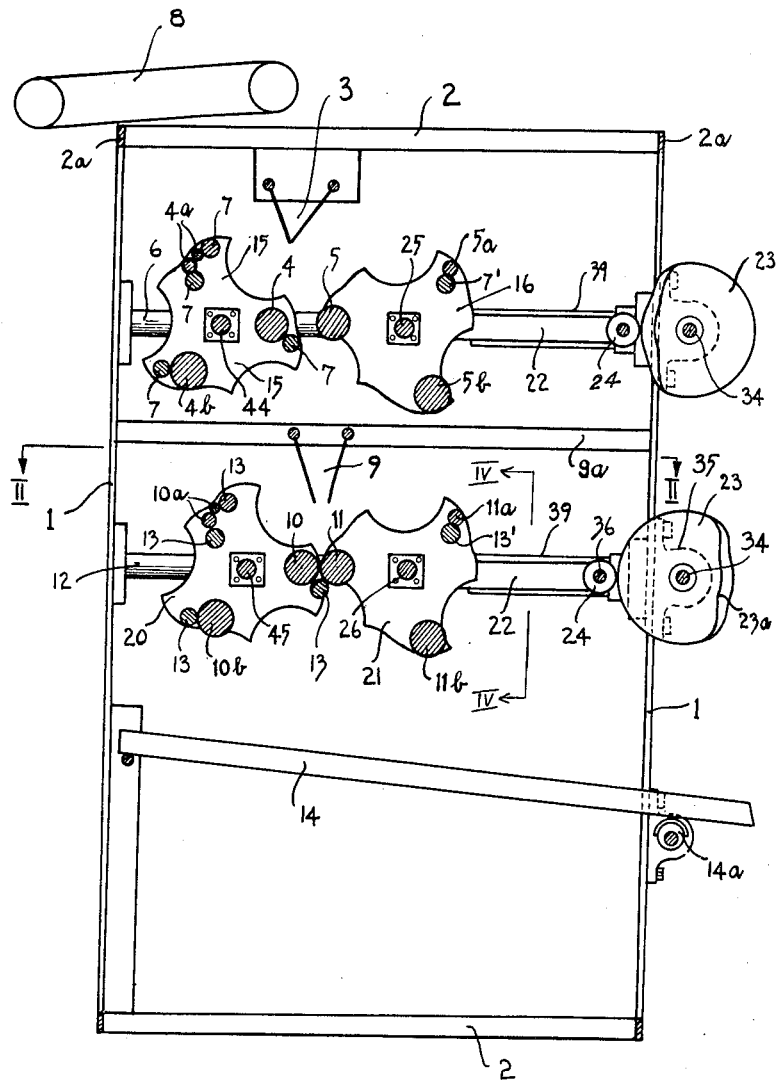
FIGURE 3 is a diagrammatic vertical sectional view of the machine taken on the line III—III of FIGURE 2.

As apparent upon consideration of the overall structure described and as clearly illustrated in FIGURE 3, selective rotation of the coacting disc pair 15 and 16 which carries the sizing rollers (or of the coacting disc pair 20 and 21 which carries the formation rollers) from a given position to present a different set of rollers in functional cooperating relationship will change the center-to-center distance between a driving and the driven sprocket. In accordance with well known conventional procedures, a series of chain loops having different lengths are provided to meet the changed dimensions As depicted schematically in FIGURE 3, the sizing rollers 4, 4a, and 4b carried on the rotatable disc 15 are adapted for positioning to cooperate respectively with sizing rollers 5, 5a, and 5b carried on the rotatable cam-controlled slidable disc 16. The support rollers 7, associated with each of the rollers carried on disc 15, are positioned to lie beneath the bight of cooperating pairs of sizing rollers. That is, either of the pair of rollers 4a may be selectively positoned, upon selective rotation of disc 15, to coact with roller 5a on disc 16 whereby the respective roller 7 adjoining each roller 4a will underlie the bight of the then coacting pair of sizing rollers 4a and 5a. Upon the selection of any given pair of cooperating sizing rollers, these are rotated in synchronism at the same angular speeds, by means of drive chains which are preferably actuated through a single drive shaft, in a manner well known in the art. In addition, auxiliary support roller 7' is provided to reinforce the relatively small diameter roller 5a carried on discs 16 to prevent distortion or bending. Each of the rollers 7 and 7' is mounted tangent to and in contact with the sizing or principal roller which it adjoins. While any preferred well known method for driving these rollers may be utilized, in the preferred arrangement depicted the support rollers are driven through frictional contact with the driven principal rollers. The method of coaction of the formation rollers such as 10, 10a and 10b with their respective formation rollers 11, 11a, and 11b and support rollers 13 and 13' and the mode of driving these rollers is the same as described for the sizing rollers. No further detailed discussion is provided, since, in the light of the foregoing description it will be readily apparent to those skilled in the art how the various rollers are driven and how to select a preferred roller combination to provide a product of the desired size.

It is contemplated that in the practice of the invention any given roller mounted on the disc supports may, if desired, be readily replaced by a roller which may differ from the original in its precise physical form and in its dimensions. Such a replacement might necessitate resetting of the axial position of the support blocks 47 on their supporting shafts. At the same time, to ensure proper mating and requisite separation of the sizing and of the formation rollers during the gum sizing, shaping, and delivery operations, it might be necessary to provide a different throw of the carriages 28 and the discs 21 carried thereby. Auxiliary cams 23a on the upper (sizing system) and on the lower (formation system) power driven shafts 34 are selectively positionable to provide this variation in carriage throw.

Since no sliding movement of the discs 15 or 20 on the rails 6 and 12 respectively is required, these discs being only required to be adapted for rotational adjustment about their central axes, it is not necessary to mount these discs upon a pair of sliding carriages. Otherwise their mounting and assembly may be similar to that of discs 16 and 21. Thus the central shafts 44, 45 of the discs 15 and 20 respectively are each extended and provided with clutch plates 46 at each end thereof which fit in recesses formed in a pair of supporting blocks 47 adapted to straddle the rails 6 and 12 to be rigidly fixed thereto in any adjusted position thereon by means of bolts 47a.

As in the case of the discs 16 and 21, the discs 15 and 20 may be adjusted to bring any one of the roller assemblies supported thereon into operative position by manual rotation of their central shafts 44, 45, and fixing the discs in such rotatably adjusted position by means of a clutch pin 48 inserted through a hole in the supporting block 47 and through one of a plurality of holes in each clutch plate 46, the clutch pin 48 being locked similarly to the locking of clutch pin 31.

Figure 5:
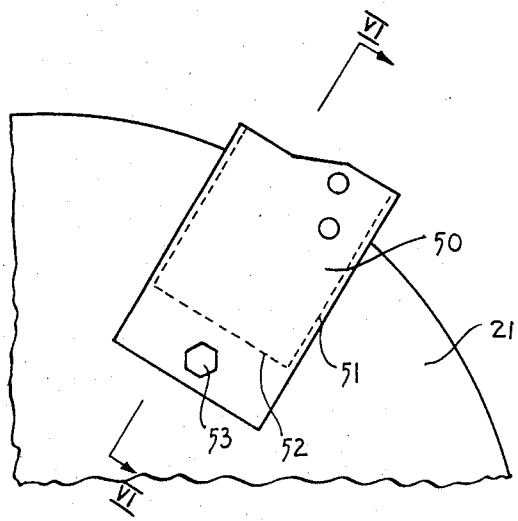
FIGURE 5 is a detail partial elevational view to an enlarged scale showing an alternative mounting of the rollers in their supporting discs.
Figure 6:
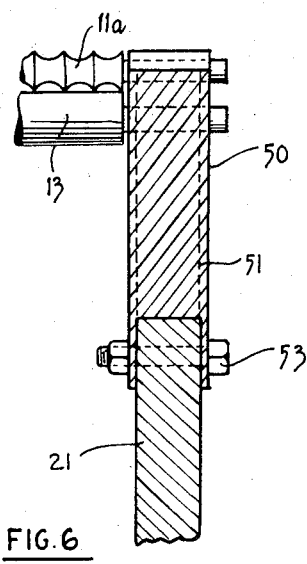
FIGURE 6 is a sectional view on the line VI—VI of FIGURE 5.

While the sizing and/or formation rollers may be rotatably supported on their respective discs in any desired manner, it is preferred to mount them as shown in FIGS. 5 and 6. Thus, as illustrated, for example, in connection with disc 21 in FIGS. 5 and 6, the disc is provided with radial recesses in the locations in which the different roller assemblies are to be positioned in the disc, and each roller assembly 11, 11a, and 11b is terminated at each end in a mounting plate 50 having grooves 51 formed in the sides thereof whereby the said plates 50 may be slidingly engaged in the recesses, and a slot 52 is cut in the innermost end of the plate 50 whereby it straddles over the disc and can be firmly secured thereto by means of a bolt 53 passing through the disc 21 and through the portions of the plate 50 straddling same. All the mounting plates 50 and the recesses are preferably made identical to admit of interchangeability of any roller system in any recess.

Apart from the very convenient and rapid adjustment of the sizing and/or formation roller system attainable by rotation of the disc supports for a plurality of the roller systems according to the invention, the aforesaid manner of mounting each roller system in a disc admits of very rapid interchanging of one roller system for another in a disc.

Since in practice the necessity for adjustment of the sizing roller system does not arise as frequently as adjustment of the formation roller system, the overall cost of production of the machine may be appreciably reduced by omitting the disc supports for a plurality of sizing roller systems, and only providing rotatable disc supports for the formation roller systems, interchangeability of sizing roller systems being facilitated with little loss of time by adopting the aforesaid preferred method of mounting a roller system in its support.

It will be understood that power actuation of the mounted roller systems, the cam shafts, the vibration of the chute, and the actuation of the conveyor can be affected in known manner by suitable transmission means from a single electric motor mounted at the base of the framework.

While particular embodiments of the invention have been described, it will be understood, of course, that the invention is not limited thereto since many modifications may be made; and it is, therefore, contemplated to cover by the appended claims any such modifications as fall within the true spirit and scope of the invention.

What I claim is:

1. A machine for making shaped pieces of chewing gum, said machine comprising: an assembly of sizing rollers in combination with an assembly of formation rollers, each said assembly comprising a first set and a second set of spaced apart and axially aligned roller-supporting rotatably positionable discs and a plurality of roller systems extending between the discs of each of said sets of discs and rotatably mounted thereon, each disc of each of said first and said second set of discs being rotatable about its central axis and being selectively positionable to any of a plurality of fixed operative positions to bring any selected one of said roller systems mounted on said first set of discs into cooperative mating relationship with any one of said roller systems mounted on said second set of discs, said sizing rollers and said formation rollers of said roller systems being adapted for correlation in cooperative mating relationship for forming different sizes of chewing gum pieces; whereby said roller systems mounted on said discs constitute means for rapidly adjusting the size of gum products shaped by said machine.

2. A machine as claimed in claim 1 wherein said first set of roller supporting discs of each assembly is adapted for reciprocating movement towards and away from said second set of roller supporting discs, shaping of the chewing gum being effected when said first set of discs approaches said second set of discs to bring the said roller systems mounted thereon into said mating relationship, and delivery of the chewing gum taking place when said first set of discs is retracted from said second set of discs.

3. A machine as claimed in claim 2 and further comprising a pair of rails, frame means supporting said rails on said machine, carriage means slidably mounted for reciprocation upon said rails, said carriage means having recesses formed therein, said first set of discs being fixedly mounted upon a central shaft formed with clutch plates at each end thereof, said clutch plates being rotatably supported within said recesses formed in said carriage means.

4. A machine as claimed in claim 3 wherein said central shaft with said discs and said clutch plates fixedly mounted thereon is manually rotatable within said recesses in said carriage means to bring any one of said roller systems mounted on said discs into any of a plurality of selected operative positions, said clutch plates being adapted to be locked to said carriages in any of such positions.

5. A machine as claimed in claim 4 and further comprising cam means urging said first set of discs toward said second set of discs, and spring means operatively disposed to provide return movement of said first set of discs during reciprocative displacement of said first from said second set of discs.

6. A machine as claimed in claim 4 and further comprising a pair of support blocks adjustably fixed to said rails, said support blocks having recesses formed therein, said second set of discs being fixedly mounted upon a central shaft formed with a clutch plate at each end thereof, and said clutch plate being rotatably supported within said recesses formed in said blocks.

7. A machine as claimed in claim 3 and further comprising cam means urging said first set of discs toward said second set of discs, and spring means operatively disposed to provide return movement of said first set of discs during reciprocative displacement of said first from said second set of discs.

8. A machine as claimed in claim 7 and further comprising a pair of support blocks adjustably fixed to said rails, said support blocks having recesses formed therein, said second set of discs being fixedly mounted upon a central shaft formed with a clutch plate at each end thereof, and said clutch plate being rotatably supported within said recesses formed in said blocks.

9. A machine as claimed in claim 3 and further comprising a pair of support blocks adjustably fixed to said rails, said support blocks having recesses formed therein, said second set of discs being fixedly mounted upon a central shaft formed with a clutch plate at each end thereof, and said clutch plate being rotatably supported within said recesses formed in said blocks.

10. A machine as claimed in claim 9, in which said central shaft with said discs and said clutch plates fixedly mounted thereon is manually rotatable within said recesses formed in said pair of supporting blocks to bring any one of the roller systems mounted on the discs into operative position, said clutch plates being adapted to be locked to the supporting blocks in this position.

11. A machine as claimed in claim 1, in which each of said roller assemblies is formed at each end with a mounting plate having grooves formed in the sides thereof for sliding engagement into radial recesses formed in said rotatably positionably discs, each said mounting plate being also provided with a slot cut in the innermost end thereof whereby it straddles each said disc at the innermost end of the recess and is fixed to each said disc by means of a bolt passing therethrough and through the portions of said mounting plate straddling same.

12. In a machine for making shaped pieces of chewing gum and including an assembly of sizing rollers in combination with an assembly of formation rollers, the improvement which comprises:

a first set and a second set of spaced apart and axially aligned rotatably positionable discs, said discs forming a part of one of said assemblies, and a plurality of roller systems extending between the discs of each set of discs and rotatably mounted thereon, each said first and said second set of discs being rotatable about its central axis and being selectively positionable to a plurality of fixed operative positions to bring any one of said roller systems mounted on said first set of discs into cooperative functional engagement with any one of said roller systems mounted on said second set of discs, said roller systems being adapted for correlation in cooperative mating relationship for forming different sizes of chewing gum pieces whereby said roller systems are readily positionable to constitute means for rapidly adjusting the size of gum products shaped and delivered by said machine.

13. In a machine for forming individual units of comestible from a mass thereof, the combination of:

a first and second pair of sizing rollers for sizing a mass to a continuous elongated rod-like configuration;

a first and a second pair of formation rollers for sequentially severing the sized mass into a series of shaped individual units;

means for placing said first pair of sizing rollers in juxtaposed proximity;

means for placing said first pair of formation rollers into juxtaposed proximity;

means for placing said second pair of sizing rollers into juxtaposed proximity; and means for placing said second pair of formation rollers into juxtaposed proximity;

whereby the machine may be adjusted for the sizing and formation of the comestible into the said individual units thereof.

14. In a machine for forming individual units of comestible such as chewing gum from a mass thereof, the combination of:

a frame housing;

a first shaft mounted for rotation in the frame housing;

a second shaft mounted for rotation in the frame housing in spaced parallel relation to the first shaft;

means for moving the first shaft toward and away from the second shaft;

a third shaft mounted for rotation in the frame housing;

a fourth shaft mounted for rotation in the frame housing in spaced parallel relation to the third shaft;

means for moving the third shaft toward and away from the fourth shaft;

flange members disposed on opposite ends of each of the said shafts;

a first sizing roller mounted in spaced parallel relation to the first shaft between the flange members affixed thereto;

a second sizing roller mounted in spaced parallel relation to the second shaft between the flange members affixed thereto;

a third sizing roller mounted in spaced parallel relation to the first shaft between the flange members affixed thereto;

a fourth sizing roller mounted in spaced parallel relation to the second shaft between the flange members affixed thereto;

means for rotating the flange members of the first and second shafts whereby the first and second sizing rollers may be maintained in juxtaposed proximity and whereby the third and fourth sizing rollers may be maintained in juxtaposed proximity;

a first formation roller mounted in spaced parallel relation to the third shaft between the flange members affixed thereto;

a second formation roller mounted in spaced parallel relation to the fourth shaft between the flange members affixed thereto;

a third formation roller mounted in spaced parallel relation to the third shaft between the flange members affixed thereto;

a fourth formation roller mounted in spaced parallel relation to the fourth shaft between the flange members affixed thereto; and means for rotating the flange members of the third and fourth shafts whereby the first and second formation rollers may be maintained in juxtaposed proximity and whereby the third and fourth formation rollers may be maintained in juxtaposed proximity, such that the machine may be adjusted for the sizing and formation of the comestible into individual units of a predetermined shape.

15. A machine as claimed in claim 14 wherein each of the formation rollers is provided with a succession of peripheral grooves thereon, the grooves on any one formation roller mating with the corresponding grooves on the formation roller in juxtaposed proximity thereto.

16. A machine as claimed in claim 14 wherein the means for moving the first shaft toward and away from the second shaft comprises a cam operated roller slide assembly for moving the first shaft in one given direction and a spring return assembly for moving the first shaft in the opposite direction and wherein the means for moving the third shaft toward and away from the fourth shaft comprises a cam operated roller slide assembly for moving the third shaft in one given direction and a spring return assembly for moving the third shaft in the opposite direction.

References Cited by the Examiner
UNITED STATES PATENTS 2,031,573   2/1936   Peterson _____ 107—10

FOREIGN PATENTS 658,795   4/1938   Germany.
565,853   8/1957   Italy.

WALTER A. SCHEEL, *Primary Examiner.*

CHARLES A. WILLMUTH, WILLIAM B. PENN, ROBERT E. PULFREY, *Examiners.*